S. L. MARTIN.
COTTON CHOPPER.
APPLICATION FILED JULY 16, 1909.
939,429.
Patented Nov. 9, 1909.
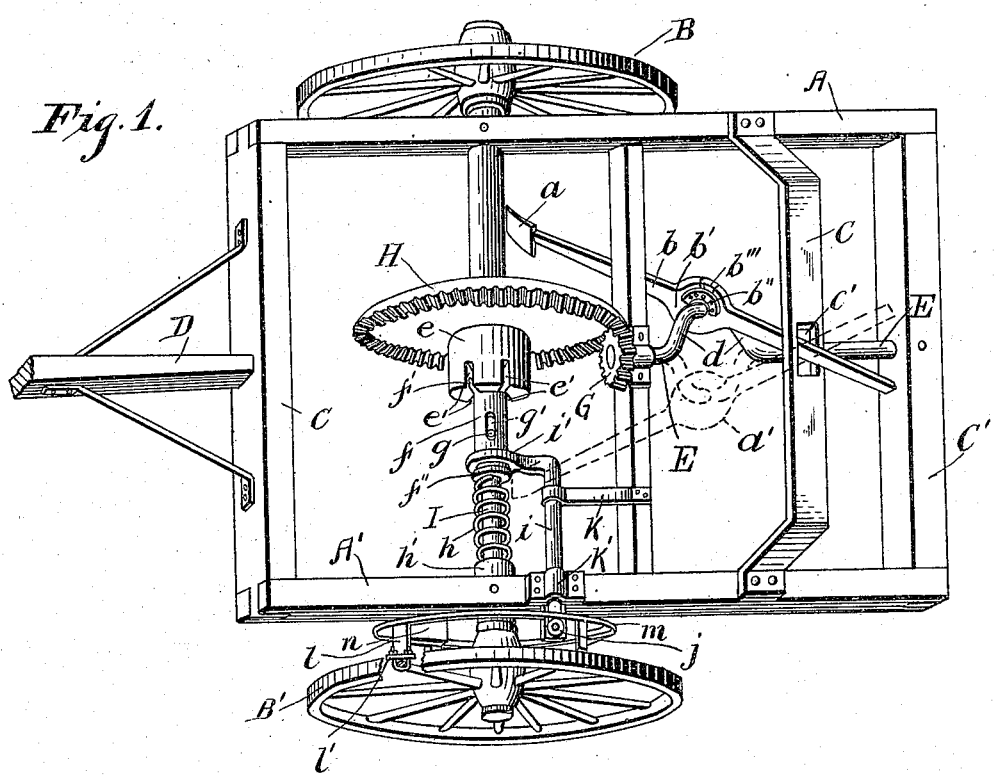
Fig. 1.
Fig. 3.
Fig. 4.
Fig. 2.
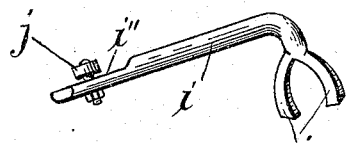
Witnesses:
S. C. Taylor
M. B. Marble
Inventor:
SIMON L. MARTIN.
By A. D. Marble
His Attorney.
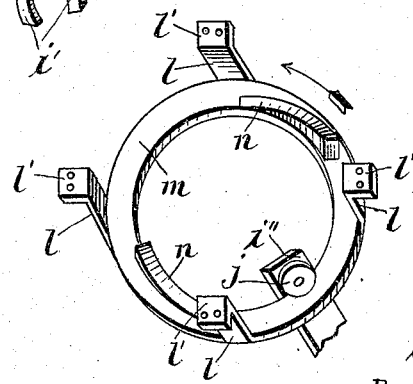

UNITED STATES PATENT OFFICE.

SIMON L. MARTIN, OF OKLAHOMA, OKLAHOMA.

COTTON-CHOPPER.

939,429.  Specification of Letters Patent.  Patented Nov. 9, 1909.

Application filed July 16, 1909. Serial No. 507,910.

*To all whom it may concern:*

Be it known that I, SIMON L. MARTIN, a citizen of the United States, residing at Oklahoma city, in the county of Oklahoma and State of Oklahoma, have invented certain new and useful Improvements in Cotton-Choppers, of which the following is a specification.

My invention relates to cotton-choppers in which a frame is mounted on wheels the axle of which rotates a bevel wheel, which by means of a bevel pinion, rotates a crank shaft, in line with the travel of the machine, the crank portion of said shaft being attached to the central portion of the handle of a shovel to operate the shovel, the upper end of its handle having but a slight lateral movement a considerable lateral movement is given to the shovel; out and in gear mechanism being provided to actuate the shovel periodically, all of which will be explained in the specification.

The objects of my invention are to produce a strong, durable and practical machine for chopping or thinning cotton. I accomplish these objects by the mechanism illustrated in the accompanying drawings, forming a part of this specification, in which:

Figure 1 is a perspective view of the complete machine embodying my invention; Fig. 2 is a perspective view of the wheel attachment for throwing the crank shaft out and in gear; Fig. 3 is a view in perspective of the main shaft sleeve in section; Fig. 4 is a perspective view of the shifting-bar.

Similar letters refer to similar parts in the several views.

Referring to the drawings, A and A' designate the right and left side sills of the frame carried by the wheels B and B'; C and C' designate the front and rear end sills and D the tongue.

It is the custom to plant cotton thick in the rows and after the plants are up and well established to "chop" out or remove some of the plants, thus thinning the plants of the field. My invention is to remove the surplus plants, and to accomplish this, I provide a shovel $a$ having an extended handle $b$, the upper end of which passes through a slot $c'$ in the guide plate $c$ to control the upper end of the shovel handle; the ends of said plate $c$ being secured to the side sills A and A'. See Fig. 1. The central portion of said shovel handle $b$ has an enlargement $b'$ in which a journal hole $b''$ is provided to which journal access is obtained by said enlargement having a portion $b'''$ cut away and riveted or bolted back in place when said handle is mounted upon the crank $d$ of its actuating shaft E, having its rear end journaled in the rear end sill C', its front end portion being journaled in the cross beam F, said shaft having secured upon its front end a bevel pinion G to actuate said shaft. To rotate said pinion a bevel wheel H is loosely mounted on the main shaft I and to provide irregular or periodical motion of the crank shaft, and therefore of the shovel $a$, the hub $e$ of the said bevel wheel has four radial slots $e'$ being equi-distant apart, and to rotate said wheel a sliding sleeve $f$ having a longitudinal projection $f'$ at one end to engage said slots $e'$ is slidably secured upon the main shaft I having a pin $g$ extending laterally therethrough and through longitudinal slots $g'$ in said sleeve causing it to revolve with the shaft, the said sleeve having upon its outer end a peripheral flange $f''$. See Figs. 1 and 3. A spiral spring $h$ is mounted upon said main shaft and has its outer end abutting against the main shaft collar $h'$ while its inner end pressing against the outer end of the said sleeve $f$ tends to hold the sleeve projection $f'$ in engagement with the radial slots $e'$. To disengage said sleeve $f$ from the hub $e$ and let the bevel wheel H remain at rest the sleeve sliding rod $i$ is provided having its inner end bent at a right angle to its stem or body member, said bent end or member being formed into two similar, but oppositely curved fingers or prongs $i'$ to saddle said sleeve and engage its flange $f''$; the outer end of said sleeve sliding rod $i$ has its upper portion flattened at $i''$ and a small pulley $j$ secured thereon, having its axis vertical to the rod $i$. See Figs. 1 and 4.

The fingers or prongs $i'$ of the sleeve sliding rod $i$ are placed one on each side of the sleeve $f$ with the rod $i$ above and in line of the sleeve in which position it is secured by the brace $k$ having one of its ends encompass the said rod $i$ and its opposite end secured to the cross beam F, and the outer end portion of the said rod rests in a box $k'$ secured to the left side sill $A'$. See Fig. 1. To operate the said sleeve sliding rod $i$, which throws the machine out of gear, a shifting device is provided, having, in the present case, four leg members $l$ projecting from the periphery of a disk-like band $m$ and at right angles to the face thereof, the said leg members having feet $l'$ turned outwardly and perforated by which means they are secured to the spokes of one of the wheels of the machine, in the present case the left wheel $B'$ is used as being most convenient, axle clips being used to secure said feet to the spokes of said wheel, keyed to the main shaft. See Figs. 1 and 2. The said band $m$ has secured to its surface toward the said legs and radially opposite each other, wedge shaped projections $n$ for the pulley $j$ to engage at each revolution of the wheel $B'$. A greater or less number of said projections, $n$, may be used depending upon the size of the main wheels of the machine B and $B'$, and the relative sizes of the bevel wheel H and pinion G.

The cotton-chopper is designed to be drawn by a pair of horses.

In operation, as the machine moves forward, so long as the sleeve projection $f'$ engages the slot $e'$ of the hub $e$ the bevel wheel H rotates which causes its pinion G to rotate, also its shaft E, which by its crank $d$ having the shovel handle $b$ secured thereon the shovel $a$ is raised, passed to the left to the position indicated by the dotted lines $a'$ then downward to the ground and slightly into the ground removing whatever cotton and weeds may be in its path. For the shovel $a$ to operate continuously would remove too much of the cotton, therefore, as the wheel $B'$ rotates the band $m$, and its wedge projections $n$ contact the pulley $j$ its supporting rod $i$ is forced outward, which by means of its fingers $i'$ engaging the flange $f''$ of the sleeve $f$ moving it longitudinally releasing the engagement of its projection $f'$ with one of the slots $e'$ of the hub $e$, thus permitting the bevel wheel H, its pinion G, its shaft E and the shovel $a$ to remain at rest until the said projection $f'$ has passed to and engaged the next slot $e'$ in the hub $e$ said engagement starting in motion the bevel wheel H, the pinion G and the shovel $a$, which continue in operation until the next wedge projection $n$ contacts the pulley $j$ and repeats the operation.

Having thus described my invention, what I claim as new and desire to secure by Letters Patent, is—

1. In a cotton-chopper having a frame of side and end sills mounted upon wheels; a crank shaft in line of the travel of the machine having its rear end journaled in the rear sill and intermediate its ends forming a crank its forward end being supported by a cross beam and having a bevel pinion secured thereon; a shovel having an extended handle with an enlargement intermediate its ends and an opening in said enlargement adapted to rest upon and be carried by said crank for the purpose of operating said shovel to remove surplus cotton; means for controlling the upper end of said shovel handle; a bevel wheel H in mesh with said pinion and loosely mounted upon the main shaft of the machine and having a hub with radial slots therein; a longitudinally slidable sleeve mounted on the main shaft of said machine and having upon its outer end a peripheral flange, and intermediate its ends a longitudinal slot to be engaged by a pin extending therethrough and into the main shaft to rotate said sleeve in unison with said shaft the inner end of said sleeve having a projection adapted to engage the said radial slots in said hub to rotate the said bevel wheel; a sleeve-sliding rod having a pulley laterally secured upon its outer end, its inner end being bent at a right angle and formed into fingers to engage the said flange of the said sleeve to operate the same, and means for reciprocating said rod for the purposes described.

2. In a cotton-chopper having a frame of side and end sills mounted upon wheels; a crank shaft in line of the travel of the machine having its rear end journaled in the rear sill and intermediate its ends forming a crank its forward end being supported by a cross beam and having a bevel pinion secured thereon; a shovel having an extended handle with an enlargement intermediate its ends and an opening in said enlargement adapted to rest upon and be carried by said crank for the purpose of operating said shovel to remove surplus cotton; means for controlling the upper end of said shovel handle; a bevel wheel in mesh with said pinion and loosely mounted upon the main shaft of the machine and having a hub with radial slots therein; a longitudinally slidable sleeve mounted on the main shaft of said machine and having upon its outer end a peripheral flange, and intermediate its ends a longitudinal slot to be engaged by a pin extending therethrough and into the main shaft to rotate said sleeve in unison with said shaft the inner end of said sleeve having a projection adapted to engage the said radial slots in said hub to rotate the said bevel wheel; a sleeve-sliding rod having a pulley laterally secured upon its outer end, its inner end being bent at a right angle and formed into fingers to engage the said flange of the said sleeve to operate the same; a disk-like band having peripheral legs at right angles to said band, said legs having perforated feet for securing them to one of the wheels of the machine, said band having upon its outer face wedge-like projections adapted to contact with said pulley to operate said sleeve-sliding rod, substantially as described.

In testimony whereof I affix my signature in presence of two witnesses.

SIMON L. MARTIN.

Witnesses:
F. L. BRANIGER,
ROBT. CHOWNING.